US006186370B1

(12) United States Patent
de Pous et al.

(10) Patent No.: US 6,186,370 B1
(45) Date of Patent: Feb. 13, 2001

(54) DEVICE AND METHOD FOR FIXING A METERING MEMBER IN A CONTAINER CONTAINING A PRODUCT TO BE DISPENSED

(75) Inventors: Olivier de Pous, Paris; Thierry Faucon, Aubergenville; Claude Jouillat, Montigny-sur-Avre, all of (FR)

(73) Assignee: Valois S.A., Le Neubourg (FR)

(*) Notice: Under 35 U.S.C. 154(b), the term of this patent shall be extended for 0 days.

(21) Appl. No.: 09/319,012

(22) PCT Filed: Nov. 28, 1997

(86) PCT No.: PCT/FR97/02156

§ 371 Date: Oct. 29, 1999

§ 102(e) Date: Oct. 29, 1999

(87) PCT Pub. No.: WO98/23505

PCT Pub. Date: Jun. 4, 1998

(30) Foreign Application Priority Data

Nov. 29, 1996 (FR) ..................................................... 96 14641

(51) Int. Cl.[7] ..................................................... G01F 11/06
(52) U.S. Cl. ..................................................... 222/321.9
(58) Field of Search ............................. 222/321.1, 321.7, 222/321.9, 385

(56) References Cited

U.S. PATENT DOCUMENTS 3,129,854 4/1964 Boehm et al. .
5,277,340 1/1994 Van Brocklin .
5,299,703 * 4/1994 Cater .................................... 222/274
5,873,491 * 2/1999 Garcia et al. ........................... 222/95
6,010,039 * 1/2000 Bougamont ........................ 222/321.9

FOREIGN PATENT DOCUMENTS 358758 11/1961 (CH) .
804839 4/1951 (DE) .
31 22 982 A1 12/1982 (DE) .
453357 10/1991 (EP) .
2699433 6/1994 (FR) .
2189778 11/1987 (GB) .

* cited by examiner

*Primary Examiner*—Kevin Shaver
*Assistant Examiner*—David A. Bonderer
(74) *Attorney, Agent, or Firm*—Rockey, Milnamow & Katz, Ltd.

(57) ABSTRACT

A device for fixing a metering member having a body, such as a pump, in the neck of a receptacle containing a substance to be dispensed, the body of the metering member having a smaller-diameter portion and a larger-diameter portion the maximum outside diameter of the body being smaller than the inside diameter of the neck the device being characterized in that the housing is formed in the neck of the receptacle, the housing being suitable for receiving a deformable member which, in the assembled state of the fixing device, is deformed and/or compressed in such a manner that it exerts a radial force on the neck and on the body, the force serving to fix the metering member in sealed manner in the neck of the receptacle, the deformable member being placed, prior to assembly, on the smaller-diameter portion and being deformed and/or compressed in the housing during assembly by the larger-diameter portion of the body of the metering member.

5 Claims, 4 Drawing Sheets

DEVICE AND METHOD FOR FIXING A METERING MEMBER IN A CONTAINER CONTAINING A PRODUCT TO BE DISPENSED

BACKGROUND OF THE INVENTION

The present invention relates to a device or a method of fixing a metering member, in particular a metering pump, in a receptacle containing a substance to be dispensed, and it applies more particularly to dispensers that dispense small quantities, as used in the fields of perfumes, cosmetics, and pharmaceuticals.

It is known in the state of the art to use a ring for mounting a pump body on a receptacle. That system suffers from certain drawbacks and, in particular, requires an assembly operation that is relatively expensive given the nature of the receptacles (samples).

Another known system, disclosed by document EP-0 453 357 avoids that drawback by providing a pump body that is dimensioned so as to be suitable for being engaged as a force-fit in the receptacle. The ring then becomes pointless. To ensure that the pump is put properly into place, its body has a bottom portion of outside diameter that is smaller than the diameter of the neck of the receptacle. Tightening takes place in the neck by engaging the top portion of the pump body as a force-fit, which top portion must have an outside diameter that is slightly greater than the diameter of said neck. That device also suffers from drawbacks. Thus, since tightening is provided by the pump body itself, the dimensions thereof and in particular its outside diameter need to be of very great precision, thereby giving rise to excessive manufacturing costs. Secondly, the diameters of the necks of receptacles, in particular receptacles made of glass, can vary slightly on manufacture, and that can prevent the pump body being properly fixed in said receptacle neck. Furthermore, in some cases, engaging the pump body itself as a force-fit can lead to said pump body being compressed and can thus give rise to friction inside the pump which can spoil operation thereof.

Another device, disclosed by German Patent Document DE-31 22 982 provides for the pump body being snap-fastened to a bead on the neck of the receptacle. That device suffers from the drawback of requiring special receptacle necks and of being unsuitable for a standard neck.

U.S. Pat. No. 5,277,340 discloses yet another type of device in which a resilient ring is disposed fixed on the pump body and snap-fastened into a housing formed inside the receptacle. The device is complicated and costly to manufacture.

Document U.S. Pat. No. 5,277,340 discloses yet another type of device in which a resilient ring is disposed fixed on the pump body and snap-fastens into a housing formed inside the receptacle. The device is complicated and costly to manufacture.

An object of the present invention is to avoid the above drawbacks by providing a fixing device which is simple and low in cost, and which enables the body of a metering member such as a pump to be fixed in the neck of a receptacle while accommodating tolerances on the dimensions of said receptacle neck. The device of the invention can thus be adapted to any receptacle neck, whether standard or otherwise, and its dimensions can vary slightly on manufacture.

SUMMARY OF THE INVENTION

The present invention thus provides a device for fixing a metering member having a body, such as a pump, in the neck of a receptacle containing a substance to be dispensed, said body of the metering member having a smaller-diameter portion and a larger-diameter portion, the maximum outside diameter of said body being smaller than the inside diameter of said neck, the device being characterized in that the housing is formed in said neck of the receptacle, said housing being suitable for receiving a deformable member which, in the assembled state of the fixing device, is deformed and/or compressed in such a manner that it exerts a radial force on said neck and on said body, said force serving to fix the metering member in sealed manner in the neck of the receptacle, said deformable member being placed, prior to assembly, on said smaller-diameter portion and being displaced, during assembly, on said larger-diameter portion of the body of the metering member, by being deformed and/or compressed in the housing.

This implementation makes assembly very easy. Installing the deformable member on the smaller diameter portion is done very easily since the deformable member is not subjected to any stress. Thereafter, the deformable member is deformed solely on the larger diameter portion and not over the full height of the pump body during engagement thereof in the neck of the receptacle. Assembly is thus easier and more reliable. In particular, this deformation and/or compression is obtained by applying a vertical force to the body of the metering member, said force being transmitted to the deformable member.

Advantageously, said portions of different diameters of the body of the metering member are interconnected by a conical portion such that deformation and/or compression of the deformable member takes place in progressive manner during assembly.

Advantageously, the housing has a cross-section that is approximately square or rectangular in shape.

Advantageously, said deformable member possesses, prior to assembly of the fixing device, a shape that is different from that of the housing, assembly of the fixing device forcing said deformable member by deformation and/or compression to take up substantially the shape of said housing, such that said deformable member exerts forces on the walls of said housing.

In another aspect, the invention also provides a method of fixing a metering member such as a pump having a pump body with a larger-diameter top portion and a smaller-diameter bottom portion in the neck of a receptacle containing a substance to be dispensed, said neck having an annular housing, the method being characterized in that it comprises the steps consisting in:

- placing a deformable member on said smaller-diameter portion of the body of the metering member;
- placing the metering member on the neck of the receptacle, said deformable member being received in said housing of the neck; and
- engaging the body of the metering member by force in the neck of the receptacle so that the deformable member is displaced on said larger-diameter portion of the body of the metering member, by being deformed and/or compressed in the housing, thereby providing sealed fixing of said metering member in the neck of the receptacle.

DETAILED DESCRIPTION OF THE PREFERRED EMBODIMENT

Figure 1:
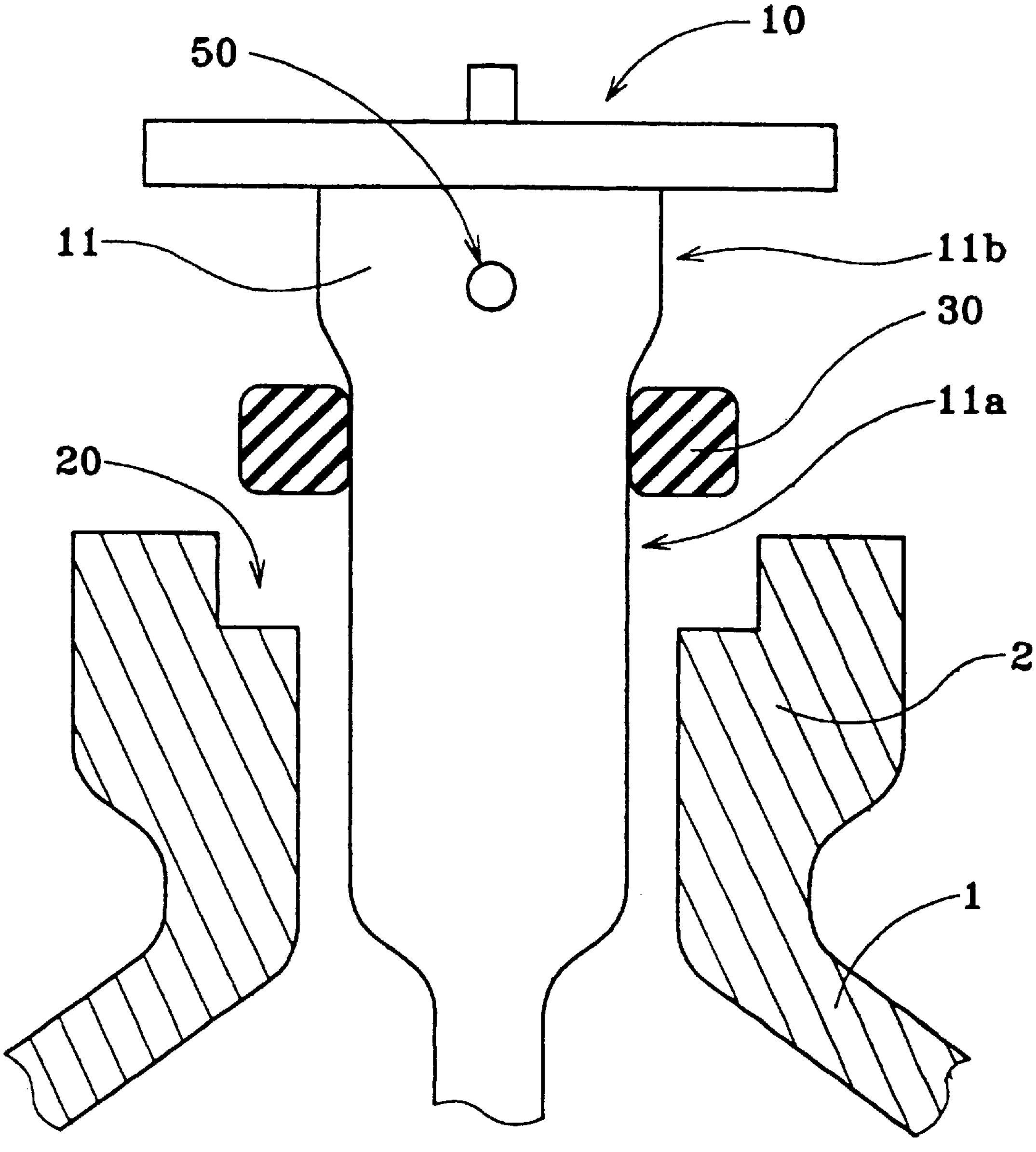
FIG. 1 is a diagrammatic vertical section view of the dispenser before insertion into the container.

With reference to the drawings, the metering assembly of the invention comprises a receptacle 1 having a cylindrical neck 2 and containing a substance to be dispensed. The receptacle can be arbitrary shape and made of any material, generally glass or a plastics material. To dispense the substance contained in the receptacle, a metering member 10 is provided, said metering member 10 having a body 11. Advantageously, said metering member 10 is a pump enabling the substance to be dispensed selectively, and the description below is made with reference to a pump. In accordance with the present invention, the outside diameter of said pump body is smaller than the inside diameter of said cylindrical neck 2 of the receptacle 1.

In accordance with the invention, in order to fix said pump body 11 in said receptacle neck 2, a housing 20 is formed in the neck 2 to receive a deformable member 30 which is preferably flexible and resilient. Said deformable member 30 is preferably annular and designed to adapt itself to the housing 10 which is also annular and which extends circumferentially around the neck 2 so that in the assembled state of the fixing device, said deformable member 30 serves simultaneously to fix the pump in the neck and to provide sealing at said neck. The resilient deformable member 30, prior to assembly of the fixing device, can be of a shape which is different from that of the housing 20, and during assembly of the fixing device, said deformable member 30 is forced by compression to cause its shape substantially to match the shape of said housing 20.

The pump body is thus fixed in the neck of the receptacle by compressing said deformable member 30 inside said housing 20, said deformable member 30 being in contact simultaneously with said receptacle neck and with said pump body.

Figure 2:
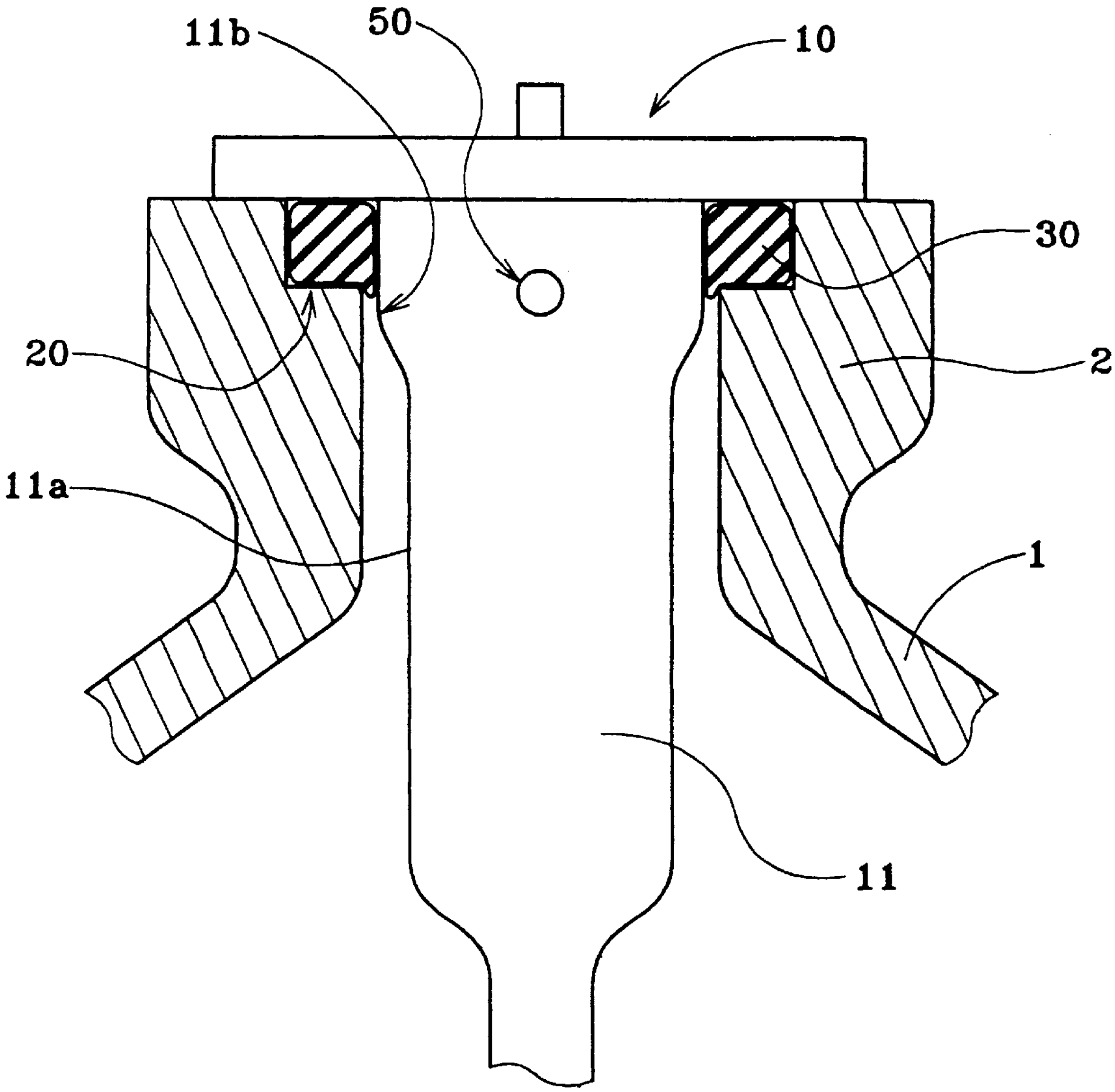
FIG. 2 is a diagrammatic vertical section of the of the dispenser inserted in the container.
Figure 3:
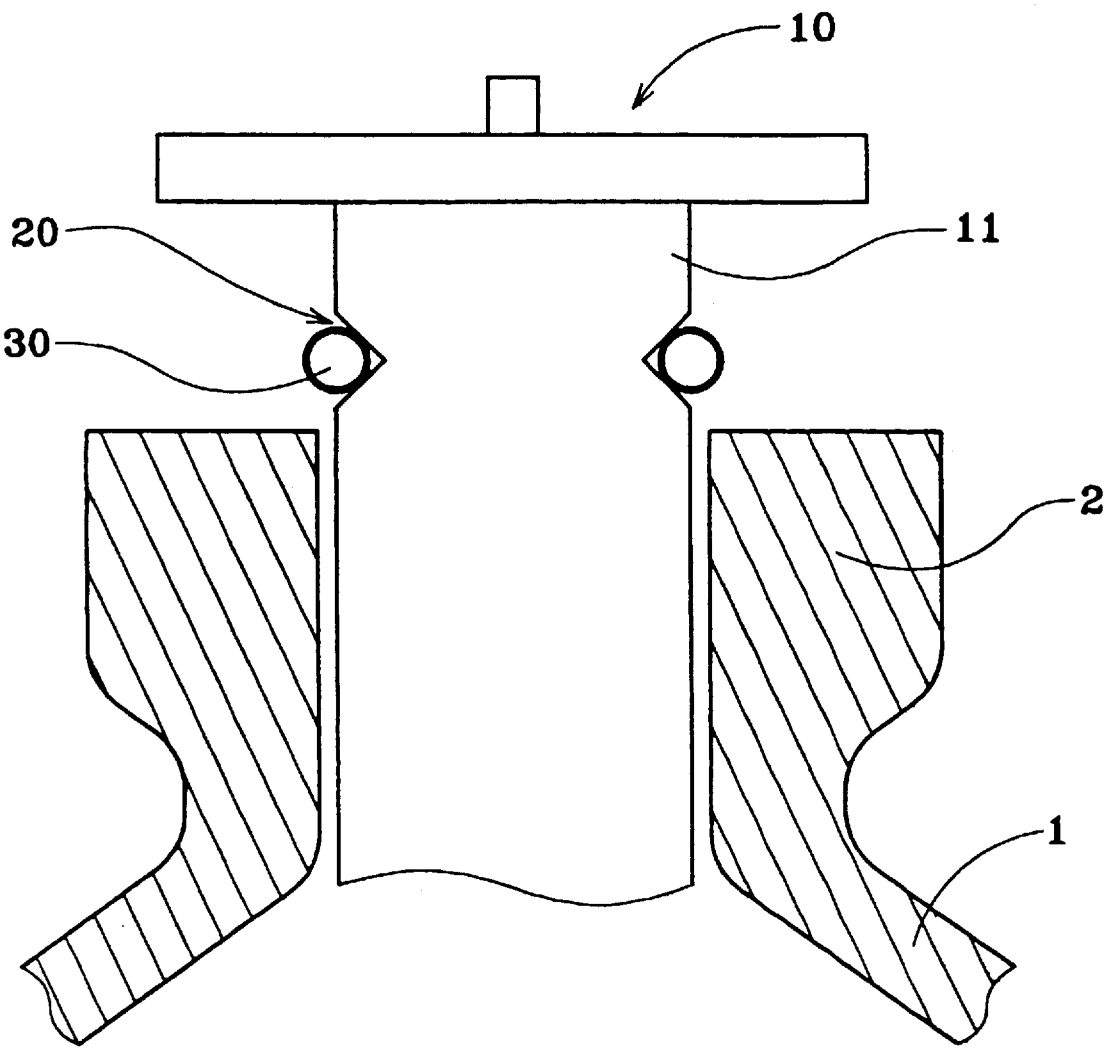
FIG. 3 is similar to FIG. 1 but showing a notch in the dispenser wherein the deformable member is located.
Figure 4:
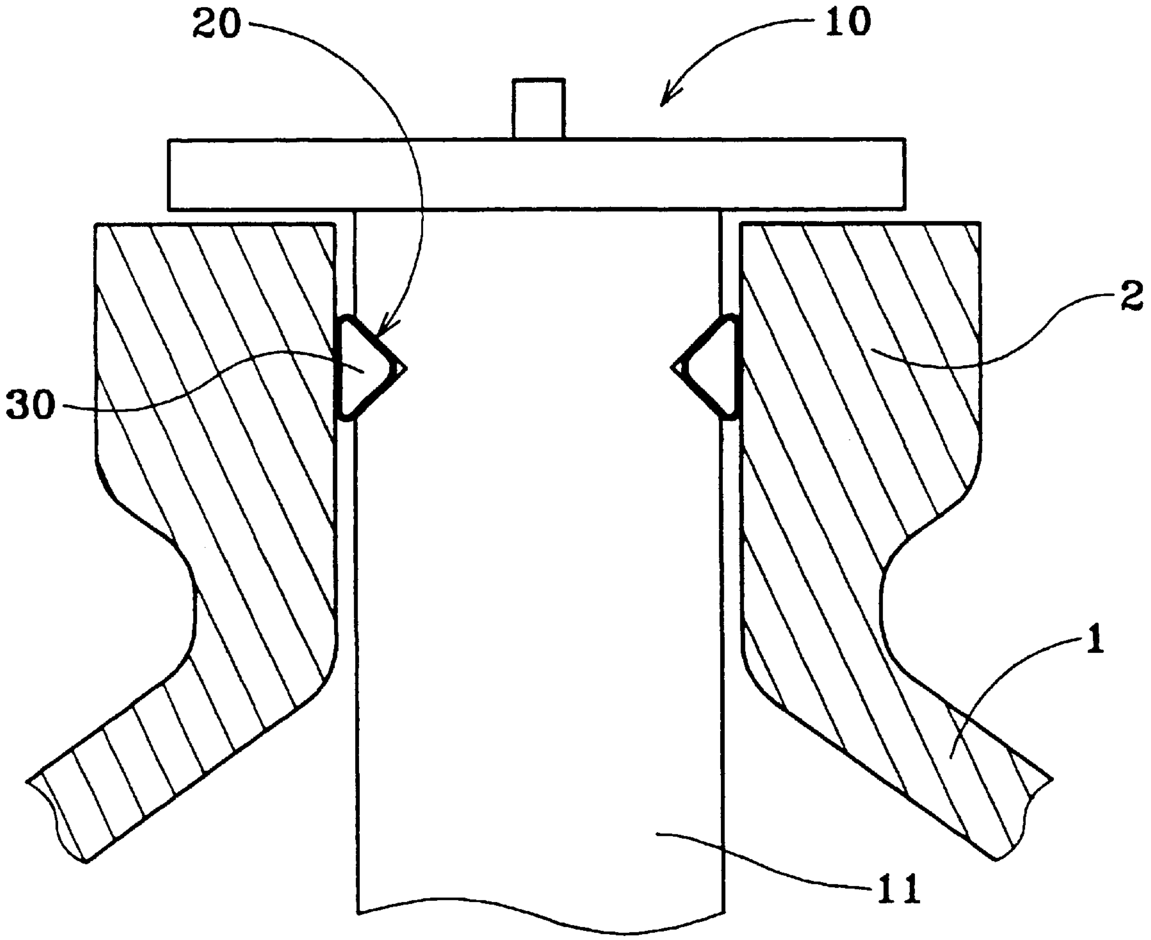
FIG. 4 shows the locking engagement of the second embodiment.

FIGS. 1 and 2 show an advantageous embodiment of the invention. In this embodiment, the housing 20 is made in the neck 2 of the receptacle 1, preferably at its top end. Prior to assembly, the deformable member 30 can be disposed in the housing 20, however it is preferably disposed on the pump body 11.

As shown in FIGS. 1 and 2, the pump body 11 has a bottom portion 11*a* of smaller diameter and a top portion 11*b* of larger diameter. Prior to assembly, the deformable member 30 fits on the smaller-diameter portion 11*a* and at the beginning of the pump body 11 being engaged in the neck, it begins by fitting itself into the housing 20 of the neck. Thereafter, the deformable member 30 is compressed and/or deformed by the larger-diameter portion 11*b*, thus creating radial force on the neck 2 and the pump body 11 which provides sealed fixing together of these two elements. Advantageously, the pump 10 has a vent hole 50 which can be provided in the larger-diameter portion 11b of the pump body 11, providing that it is located in the assembled state of the device beneath the deformable member 30 which provides sealed fixing of the pump on the receptacle.

The two portions 11*a* and 11*b* of the pump body 11 are preferably interconnected by a conical portion so that the deformation and/or compression of the deformable member 30 takes place progressively during assembly, thereby facilitating assembly.

Advantageously, the housing 20 is approximately square or rectangular in cross-section, as is the deformable member 30. Naturally, the dimensions of the housing and of the deformable member do not match exactly, so as to ensure that the deformable member 30 is subjected to deformation and/or compression in the housing 20.

Similarly, any other vertical section for the deformable member could be envisaged providing it does not correspond exactly in shape and size to the vertical section of the housing 20 which can also be of arbitrary shape. Thus, during engagement, the deformable member 30 is constrained to take up approximately the same shape as said housing 20, thus exerting radial forces on the neck and the pump body so as to fix them together and provide sealing.

What is claimed is:

1. A device for fixing a metering member having a body in the neck of a receptacle containing a substance to be dispensed, said body of the metering member having a smaller-diameter portion and a larger-diameter portion, the maximum outside diameter of said body being smaller than the inside diameter of said neck, wherein the housing is formed in said neck of the receptacle, said housing being suitable for receiving a deformable member which, in the assembled state of the fixing device is, deformed and/or compressed in such a manner that it exerts a radial force on said neck and on said body, said force serving to fix the metering member in sealed manner in the neck of the receptacle, said deformable member being placed, prior to assembly, on said smaller-diameter portion and being displaced during assembly, on said larger-diameter portion of the body of the metering member, by being deformed and/or compressed in the housing.

2. A device according to claim 1, in which said portions of different diameters of the body of the metering member are interconnected by a conical portion such that deformation and/or compression of the deformable member takes place in progressive manner during assembly.

3. A device according to claim 1 or 2, in which the housing has a cross-section that is approximately square or rectangular in shape.

4. A device according to claim 1 or 2, in which said deformable member possesses, prior to assembly of the fixing device, a shape that is different from that of the housing, assembly of the fixing device forcing said deformable member by deformation and/or compression to take up substantially the shape of said housing, such that said deformable member exerts forces on the walls of said housing.

5. A method of fixing a metering member having a body with a larger diameter top portion and a smaller-diameter bottom portion in the neck of a receptacle containing a substance to be dispensed, said neck having an annular housing, wherein the method comprises the steps of:

placing a deformable member on said smaller-diameter portion of the body of the metering member;

placing the metering member on the neck of the receptacle, said deformable member being received in said housing of the neck; and engaging the body of the metering member by force in the neck of the receptacle so that the deformable member is displaced on said larger-diameter portion of the body of the metering member, thereby providing sealed fixing of said metering member in the neck of the receptacle.

* * * * *